May 2, 1933.  C. W. DAVIS  1,906,316
MANTLE SUPPORT
Original Filed July 25, 1927   2 Sheets-Sheet 2
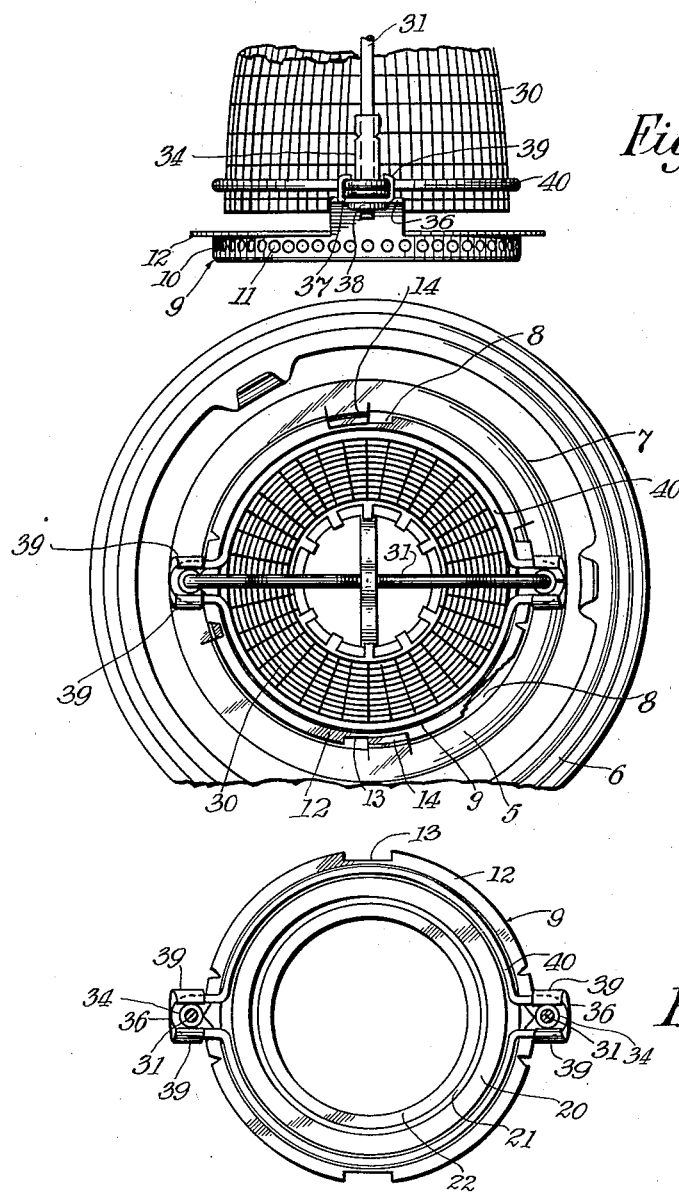
INVENTOR
Cortland W. Davis,
BY
ATTORNEY.

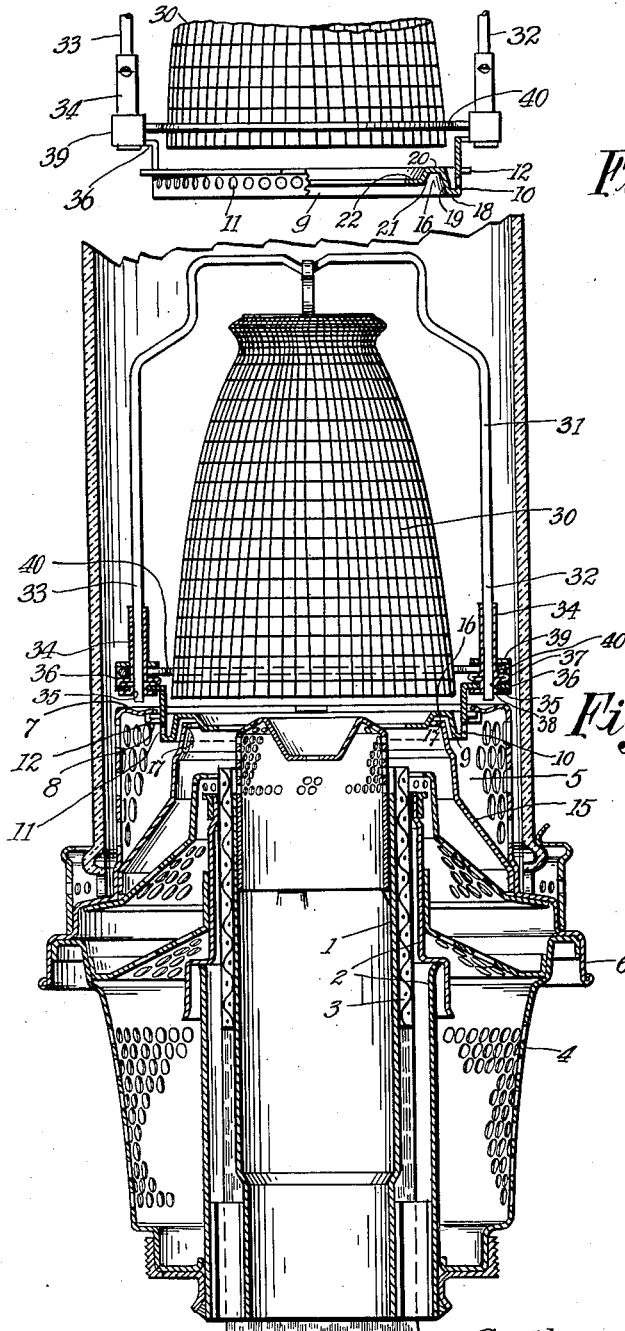

Patented May 2, 1933

1,906,316

UNITED STATES PATENT OFFICE

CORTLAND W. DAVIS, OF OAK PARK, ILLINOIS, ASSIGNOR TO THE MANTLE LAMP COMPANY OF AMERICA, OF CHICAGO, ILLINOIS, A CORPORATION OF ILLINOIS

MANTLE SUPPORT

Original application filed July 25, 1927, Serial No. 208,286. Divided and this application filed November 12, 1928. Serial No. 318,873.

This application is a division of the application of Cortland W. Davis, #208,286, for a blue-flame mantle lamp, filed July 25, 1927, in which are revealed several improvements all of which co-operate to control the functioning of the burner with which a lamp of that type is provided, whereby it is possible to reduce the creeping or working-up tendency of the flame, to obtain a full light from the lamp in a short period of time, and to render the operation of the lamp stable and reliable.

Among these several features of construction are a new chimney and its retaining means, a new flame spreader, a new burner cone construction, a new flame-protecting baffle, a new mantle head and a new mantle supporting means. The disclosure and the claims of this application relate to the mantle-supporting means.

The invention will be fully understood if reference is made to the following description, read in connection with the drawings, in which—

Figure 1 is a vertical sectional view of a blue-flame lamp containing the improved mantle mounting;

Figure 2 is a view in elevation showing details of a removable ring constituting a part of the mantle mounting;

Figure 3 is a fragmentary front elevation showing the mantle and its support;

Figure 4 is a top view of the mantle and its support, showing the engagement of the mantle support and the subjacent part of the burner, the chimney being removed, and Figure 5 is a plan view of the mantle support.

The horizontal terminal lip of the burner cone, due to its proximity to the flame of the lamp and exposure to the radiant heat of the mantle, is an element of the burner which becomes very highly heated, and an improvement, provided by this invention, consists in forming the burner cone in two sections which are so related as to perform the normal functions of a continuous burner cone, and, at the same time, are separated so as to substantially insulate said terminal lip from the other part of the burner cone, means being provided for conducting heat away from the terminal lip and for dissipating this heat before it can be conducted to any element of the burner which would affect the vaporization of fuel from the wick.

By making the cone of the burner in two sections it becomes possible to utilize the upper section as a removable support for an incandescent mantle. This section of the burner cone, being made as a separate article, admits of a configuration which is best adapted to withstand distortional strains and warping by heat. The utilization of a cone having a separable upper section makes it possible to renew said upper section which, if damaged by denting or other distortion, materially affects the successful operation of the lamp. A feature of the mantle support which is carried by this upper section is means encircling and centralizing the lower end of the mantle and holding it in proper relation to the upper section of the burner cone. This external centralizing device admits of the sustention of the mantle at an altitude which leaves a space between its lower edge and the subjacent part. Free passage of air through this space improves the operation of the burner.

The burner includes inner and outer wick tubes 1, 2 (Figure 1), a wick 3 operated by a suitable wick raiser, and a perforated basket 4 on which is detachably mounted on a basal support such as an air-cooled perforated cylinder 5, constituting a portion of the burner gallery 6, the top edge of this cylinder being bent inward at 7 and having an internal seat 8 (Figures 1, 4) for sustaining the mantle-supporting ring 9 which constitutes a part of the mantle mounting, said ring being provided with a vertical wall 10 (Figure 1) having air holes 11, and with an outwardly-turned flange 12 extending from said wall 10 and over said seat 8. This flange 12 has notches 13 (Figure 4) and the cylinder 5 has lugs 14 (Figure 4) cut from its seat. When the ring 9 and its associated parts are to be connected with said cylinder 5, the notches 13 are made to coincide with the lugs 14, the ring 9 is pushed down upon the seat 8, and said ring is then turned to bring said lugs 14 opposite unnotched parts of the flange 12 to establish an interlock between these two elements.

The burner is provided with a primary cone 15 (Figure 1) which is suitably supported in the gallery 6 and this cone 15 extends upward, terminating within a recess 16 (Figure 1) of the ring 9 and having at its top a small inturned flange 17 which is slightly spaced from the ring 9 at that point to break the heat-conductive path which, otherwise, would exist.

The ring 9 is formed by so shaping a metal annulus that a cross section thereof (Figures 1, 2) shows the perforated wall 10 and its outwardly-turned flange 12, a lower horizontal portion 18, a tapered wall 19, an upper horizontal portion 20, a depending wall 21, and the supplemental cone 22 which extends inward from said depending wall.

The ring 9, as thus made, is very stiff, and, consequently, is not subject to distortion by the intense heat of the burner.

The mantle 30 is supported by a wire 31 which is so bent as to have substantially parallel ends 32, 33. Tubular sockets 34 receive and support these ends, these tubular sockets being in turn supported by the ring 9 having holes 35 (Figure 1) in oppositely disposed lugs 36 thereof, through which said sockets extend. Each socket has a bead 37 which prevents descent thereof in the lug 36, and its lower end 38 is upset to clamp the lug 36 between it and the bead 37.

The lugs 36 have each lateral projections 39, and these projections are bent over a wire 40 which rests on the bead 37 and encircles the mantle 30 to thereby hold said mantle in concentric relation to the burner.

Supporting and centralizing the mantle with its base at an altitude above the burner cone makes it possible to use a mantle of a smaller diameter at its base than the burner cone. Thus it is possible to bring the mantle closer to the flame of the burner in this arrangement of supporting and centralizing of the mantle than is common practice in the prior art.

Other advantages of this new mantle support, are that the ring carrying the mantle-supporting wires occupies less vertical space than the entire cone heretofore employed for the same purpose, and admits of its inclusion in a relatively small carton; that excessive lateral vibrations of the mantle are prevented; that, since it is no longer necessary for the skirt of the mantle to encircle the burner cone, less mantle material is required, and that the mantle is free to expand without encountering resistance below it so that distortion or buckling thereof is avoided.

Furthermore, in the usual type of burner in which the base of the mantle surrounds the cone of the burner, when the collodion coating is burned off, frequently the bottom of the mantle adheres to the burner cone. This prevents the free expansion and contraction of the mantle when heated and cooled, and usually results in the breaking of the mantle.

Having thus described the invention, what I claim is:

1. An independent mantle-mounting unit, including a grooved ring having a horizontal body portion, and means associated with and situated above said ring for mounting a mantle, combined with means disposed above and separate from said ring for centralizing a mantle.

2. An independent mantle-mounting unit, including a mantle-supporting ring having a horizontal marginal flange extending from its upper edge for engaging a suitable support, and upwardly-extending means on said flange for engaging a mantle wire.

3. An independent mantle-mounting unit, including a mantle-supporting wire, a ring to which the lower ends of said wire are attached, and means concentric with the lower end of a mantle sustained by said ring for centering said mantle, said ring having means at its margin for supporting it independently of a burner cone.

4. An independent mantle-mounting unit, including a mantle-supporting wire, a perforated ring to which the lower ends of said wire are attached, and means concentric with the lower end of a mantle sustained by said perforated ring for centering the mantle, said ring having means at its margin for supporting it independently of a burner cone.

5. An independent mantle-mounting unit, including a mantle-supporting wire, a ring having outstanding lugs to which the lower ends of said wire are attached, and mantle-centering means concentric with the lower end of a mantle engaging said lugs.

6. An independent mantle-mounting unit, including a ring having outstanding lugs each provided with lateral projections, and mantle-centering means concentric with the lower end of a mantle, the ends of said projections extending over portions of said mantle-centering means.

7. An independent mantle-mounting unit, including a ring having outstanding perforated lugs, tubular sockets for a mantle-supporting wire mounted in the perforations of said lugs, and mantle-centering means concentric with a mantle mounted in fixed relation to said ring.

8. An independent mantle-mounting unit, including a mantle-supporting wire, and means disposed at the lower part of said unit for supporting said wire, said unit including external means which adapts it to be supported above the body of a burner cone.

9. A mantle-supporting device for blue-flame burners of the burner-cone wick type in which the mantle is held with its lower edge free to expand downward, including a base and a mantle-sustaining wire disposed above said base, the lower end of which wire terminates above the body of the burner cone.

10. A mantle-supporting unit for burners of the blue-flame wick type, including a supporting element, a centering element for the lower end of a mantle, and a mantle-sustaining wire extending upward from and attached to said supporting element and having its lower end terminating above the body of the cone of a burner to which said unit may be applied.

11. A mantle-supporting unit for burners of the blue-flame wick type, including a supporting ring, a centering element for the lower end of a mantle, and a mantle-sustaining wire extending upward from and attached to said supporting ring and having its lower end terminating above the body of the cone of a burner to which said unit may be applied.

12. A mantle-supporting unit for burners of the blue-flame wick type, including a burner-cone top, a centering element for the lower end of a mantle, and a mantle-sustaining wire extending upward from and attached to said burner-cone top and having its lower end terminating above said burner-cone top.

13. A mantle-supporting unit for burners of the blue-flame wick type, including a supporting element, a centering element for the lower end of a mantle, a lug and a socket carried by said supporting element, and a mantle-sustaining wire held by said socket and having its lower end terminating above the body of the cone of a burner to which said unit may be applied.

14. A mantle-supporting unit for burners of the blue-flame wick type, including a grooved ring constituting a burner-cone top, a centering element for the lower end of a mantle, and a mantle-sustaining wire extending upward from and attached to said burner-cone top and having its lower end terminating above said burner-cone top.

15. A mantle-supporting unit for use on blue-flame burners of the burner-cone wick type, including a mantle, a wire for suspending the mantle, means for centralizing the mantle at its lower end, and means for centralizing the mantle mounting relatively to the top of the burner cone, the mantle-supporting unit having means for introducing air underneath the mantle, but below the mantle-centralization means and above the cone of the burner to which the mantle-supporting unit may be applied.

16. A mantle support for use on a blue-flame burner of the wick type, said support having a circular base portion and including a supporting wire extending upward from said base portion, and said support having means for centralizing a mantle at its lower end, there being in said support air-admitting means situated between the base of said support and the means for centering the mantle.

17. An independent mantle-supporting device for use with a burner of the blue-flame wick and burner-cone type, said mantle-supporting device including means for centering a mantle, a mantle-suspension wire, and means for sustaining said mantle-suspension wire disposed at the lower end thereof, said sustaining means and said suspension wire being so disposed in said mantle-supporting device as to rest wholly above the cone of the burner with which said mantle-supporting device, when in operative position, is used.

18. An independent mantle-supporting device for use with a burner of the blue-flame wick and burner-cone type, said mantle-supporting device including means for centering a mantle, a mantle-suspension wire, and means for sustaining said mantle-suspension wire disposed at the lower end thereof, said sustaining means and said suspension wire being so disposed in said mantle-supporting device as to rest wholly above the cone of the burner with which said mantle-supporting device, when in operative position, is used, and said mantle-supporting device having means for the introduction of air below a mantle.

19. A mantle-sustaining unit including a mantle-sustaining wire, sockets for the ends of said wire, a mantle-center ring fixedly-related to said wire and said sockets, and means enabling said unit to be supported by a subjacent element of a wick burner of the blue-flame type, whereby the unit is disposed above the burner-cone thereof.

In testimony whereof I affix my signature.

CORTLAND W. DAVIS.